United States Patent
Conrad (10) Patent No.: US 9,949,601 B2
(45) Date of Patent: Apr. 24, 2018

(54) CYCLONIC SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 875 days.

(21) Appl. No.: 14/472,086

(22) Filed: Aug. 28, 2014

(65) Prior Publication Data

US 2014/0366313 A1    Dec. 18, 2014

Related U.S. Application Data

(60) Continuation of application No. 13/784,590, filed on Mar. 4, 2013, now Pat. No. 8,844,093, which is a
(Continued)

(30) Foreign Application Priority Data

Aug. 29, 2007  (CA) ..................................... 2599303

(51) Int. Cl.
*A47L 9/16* (2006.01)
*A47L 5/24* (2006.01)
(Continued)

(52) U.S. Cl.
CPC ................. *A47L 5/24* (2013.01); *A47L 9/122* (2013.01); *A47L 9/165* (2013.01); *A47L 9/1608* (2013.01);
(Continued)

(58) Field of Classification Search
CPC ........ A47L 5/24; A47L 9/1625; A47L 9/1641; A47L 9/165; A47L 9/1608; A47L 9/1658;
(Continued)

(56) References Cited

U.S. PATENT DOCUMENTS 911,258 A    2/1909  Gotthilf et al.
1,600,762 A    9/1926  Hawley et al.
(Continued)

FOREIGN PATENT DOCUMENTS

CA    1077412 A1    5/1980
CA    2438079 C    8/2009
(Continued)

OTHER PUBLICATIONS

English machine translation of CN1434688, as published on Aug. 6, 2003.
(Continued)

*Primary Examiner* — David Redding
(74) *Attorney, Agent, or Firm* — Philip C. Mendes da Costa; Bereskin & Parr LLP/S.E.N.C.R.L., s.r.l.

(57) ABSTRACT

A surface cleaning apparatus, which in one embodiment is a hand held vacuum cleaner, comprises a cyclone and a suction motor wherein the cyclone air outlet and the suction motor inlet are positioned towards the same end of the surface cleaning apparatus whereby air exiting the cyclone travels laterally and then axially to the suction motor inlet. A surface cleaning apparatus comprises a cyclone and a suction motor wherein the suction motor is positioned rearward of the cyclone and the cyclone air outlet is positioned at a lower end of the cyclone whereby air exiting the cyclone travels laterally and then axially towards the suction motor inlet.

20 Claims, 6 Drawing Sheets

Related U.S. Application Data division of application No. 12/675,611, filed as application No. PCT/CA2008/001534 on Aug. 28, 2008, now Pat. No. 8,677,558.

(51) Int. Cl.
- *A47L 9/12* (2006.01)
- *A47L 9/20* (2006.01)
- *A47L 7/00* (2006.01)

(52) U.S. Cl.
CPC .......... *A47L 9/1625* (2013.01); *A47L 9/1641* (2013.01); *A47L 9/1658* (2013.01); *A47L 9/1666* (2013.01); *A47L 9/1683* (2013.01); *A47L 9/20* (2013.01); *A47L 7/0028* (2013.01); *A47L 7/0038* (2013.01); *Y10T 156/1158* (2015.01); *Y10T 428/17* (2015.01); *Y10T 428/19* (2015.01); *Y10T 428/24488* (2015.01)

(58) Field of Classification Search
CPC ........ A47L 9/1683; A47L 9/20; A47L 9/1666; A47L 9/122; A47L 7/0028; A47L 9/16
See application file for complete search history.

(56) References Cited

U.S. PATENT DOCUMENTS

| | | |
|---|---|---|
| 1,797,812 A | 3/1931 | Waring et al. |
| 1,898,608 A | 2/1933 | Alexander et al. |
| 1,937,765 A | 12/1933 | Leathers et al. |
| 2,015,464 A | 9/1935 | Saint-Jacques et al. |
| 2,152,114 A | 3/1939 | Tongeren |
| 2,542,634 A | 2/1951 | Davis et al. |
| 2,678,110 A | 5/1954 | Madsen et al. |
| 2,731,102 A | 1/1956 | James et al. |
| 2,811,219 A | 10/1957 | Wenzl et al. |
| 2,846,024 A | 8/1958 | Bremi et al. |
| 2,913,111 A | 11/1959 | Rogers et al. |
| 2,917,131 A | 12/1959 | Evans et al. |
| 2,937,713 A | 5/1960 | Stephenson et al. |
| 2,942,691 A | 6/1960 | Dillon et al. |
| 2,942,692 A | 6/1960 | August et al. |
| 2,946,451 A | 7/1960 | Culleton et al. |
| 2,952,330 A | 9/1960 | Winslow et al. |
| 2,981,369 A | 4/1961 | Yellott et al. |
| 3,032,954 A | 5/1962 | Racklyeft et al. |
| 3,085,221 A | 4/1963 | Francis et al. |
| 3,130,157 A | 4/1964 | Kelsall et al. |
| 3,200,568 A | 8/1965 | McNeil et al. |
| 3,204,772 A | 9/1965 | Ruxton et al. |
| 3,217,469 A | 11/1965 | Eckert et al. |
| 3,269,097 A | 8/1966 | German et al. |
| 3,320,727 A * | 5/1967 | Farley .................... A47L 9/125 15/327.1 |
| 3,372,532 A | 3/1968 | Campbell et al. |
| 3,426,513 A | 2/1969 | Bauer |
| 3,518,815 A | 7/1970 | Peterson et al. |
| 3,530,649 A | 9/1970 | Porsch et al. |
| 3,561,824 A | 2/1971 | Homan |
| 3,582,616 A | 6/1971 | Wrob |
| 3,675,401 A | 7/1972 | Cordes |
| 3,684,093 A | 8/1972 | Kono et al. |
| 3,822,533 A | 7/1974 | Oranje et al. |
| 3,898,068 A | 8/1975 | McNeil |
| 3,933,450 A | 1/1976 | Percevaut |
| 3,988,132 A | 10/1976 | Oranje |
| 3,988,133 A | 10/1976 | Schady |
| 4,097,381 A | 6/1978 | Ritzler et al. |
| 4,187,088 A | 2/1980 | Hodgson et al. |
| 4,218,805 A | 8/1980 | Brazier et al. |
| 4,236,903 A | 12/1980 | Malmsten |
| 4,307,485 A | 12/1981 | Dessig |
| 4,373,228 A | 2/1983 | Dyson et al. |
| 4,382,804 A | 5/1983 | Mellor et al. |
| 4,409,008 A | 10/1983 | Solymes |
| 4,486,207 A | 12/1984 | Baillie |
| 4,678,588 A | 7/1987 | Shortt |
| 4,744,958 A | 5/1988 | Pircon et al. |
| 4,778,494 A | 10/1988 | Patterson |
| 4,826,515 A | 5/1989 | Dyson et al. |
| 4,836,515 A | 5/1989 | Dyson |
| D303,173 S | 8/1989 | Miyamoto et al. |
| 4,853,008 A | 8/1989 | Dyson |
| 4,853,011 A | 8/1989 | Dyson et al. |
| 4,853,111 A | 8/1989 | MacArthur et al. |
| 4,905,342 A | 3/1990 | Ataka |
| 4,944,780 A | 7/1990 | Usmani |
| 5,078,761 A | 1/1992 | Dyson et al. |
| 5,080,697 A | 1/1992 | Finke et al. |
| 5,090,976 A | 2/1992 | Dyson et al. |
| 5,129,125 A | 7/1992 | Gamou et al. |
| 5,224,238 A | 7/1993 | Bartlett |
| 5,230,722 A * | 7/1993 | Yonkers .................. A47L 5/30 15/353 |
| 5,254,019 A | 10/1993 | Noschese |
| 5,267,371 A | 12/1993 | Soler et al. |
| 5,309,601 A | 5/1994 | Hampton et al. |
| 5,347,679 A | 9/1994 | Saunders et al. |
| 5,481,780 A | 1/1996 | Daneshvar |
| 5,599,365 A | 2/1997 | Alday et al. |
| D380,033 S | 6/1997 | Theiss et al. |
| 5,755,096 A | 5/1998 | Holleyman |
| 5,815,878 A | 10/1998 | Murakami et al. |
| 5,858,038 A | 1/1999 | Dyson et al. |
| 5,858,043 A | 1/1999 | Geise et al. |
| 5,893,938 A | 4/1999 | Dyson et al. |
| 5,935,279 A | 8/1999 | Kilstroem et al. |
| 5,950,274 A | 9/1999 | Kilstrom |
| 6,071,095 A | 6/2000 | Verkaart et al. |
| 6,071,321 A | 6/2000 | Trapp et al. |
| 6,080,022 A | 6/2000 | Shaberman et al. |
| 6,081,961 A | 7/2000 | Wang |
| 6,122,796 A | 9/2000 | Downham et al. |
| 6,221,134 B1 | 4/2001 | Conrad et al. |
| 6,228,260 B1 | 5/2001 | Conrad et al. |
| 6,231,645 B1 | 5/2001 | Conrad et al. |
| 6,251,296 B1 | 6/2001 | Conrad et al. |
| 6,260,234 B1 | 7/2001 | Wright et al. |
| 6,345,408 B1 | 2/2002 | Nagai et al. |
| 6,406,505 B1 * | 6/2002 | Oh .......................... A47L 5/362 15/353 |
| 6,434,785 B1 | 8/2002 | Vandenbelt et al. |
| 6,440,197 B1 | 8/2002 | Conrad et al. |
| 6,531,066 B1 | 3/2003 | Saunders et al. |
| 6,553,612 B1 | 4/2003 | Dyson et al. |
| 6,553,613 B2 | 4/2003 | Onishi et al. |
| 6,560,818 B1 | 5/2003 | Hasko |
| 6,581,239 B1 | 6/2003 | Dyson et al. |
| 6,599,338 B2 | 7/2003 | Oh et al. |
| 6,599,350 B1 | 7/2003 | Rockwell et al. |
| 6,613,316 B2 | 9/2003 | Sun et al. |
| 6,623,539 B2 | 9/2003 | Lee et al. |
| 6,625,845 B2 | 9/2003 | Matsumoto et al. |
| 6,648,934 B2 | 11/2003 | Choi et al. |
| 6,712,868 B2 | 3/2004 | Murphy et al. |
| 6,746,500 B1 | 6/2004 | Park et al. |
| 6,782,583 B2 | 8/2004 | Oh |
| 6,782,585 B1 | 8/2004 | Conrad et al. |
| 6,818,036 B1 | 11/2004 | Seaman |
| 6,833,015 B2 | 12/2004 | Oh et al. |
| 6,868,578 B1 | 3/2005 | Kasper et al. |
| 6,874,197 B1 | 4/2005 | Conrad et al. |
| 6,896,719 B2 | 5/2005 | Coates et al. |
| 6,929,516 B2 | 8/2005 | Brochu et al. |
| 6,968,596 B2 | 11/2005 | Oh et al. |
| 6,976,885 B2 | 12/2005 | Lord |
| 7,160,346 B2 | 1/2007 | Park |
| 7,162,770 B2 | 1/2007 | Davidshofer |
| 7,175,682 B2 | 2/2007 | Nakai et al. |
| 7,198,656 B2 | 4/2007 | Takemoto et al. |
| 7,222,393 B2 | 5/2007 | Kaffenberger et al. |
| 7,272,872 B2 | 9/2007 | Choi |
| 7,278,181 B2 | 10/2007 | Harris et al. |
| 7,341,611 B2 | 3/2008 | Greene et al. |

(56) References Cited

U.S. PATENT DOCUMENTS

| | | |
|---|---|---|
| 7,354,468 B2 | 4/2008 | Arnold et al. |
| 7,370,387 B2 | 5/2008 | Walker et al. |
| 7,377,007 B2 | 5/2008 | Best |
| 7,377,953 B2 | 5/2008 | Oh |
| 7,386,915 B2 | 6/2008 | Blocker et al. |
| 7,395,579 B2 | 7/2008 | Oh |
| 7,448,363 B1 | 11/2008 | Rasmussen et al. |
| 7,449,040 B2 | 11/2008 | Conrad et al. |
| 7,488,362 B2 | 2/2009 | Jeong et al. |
| 7,488,363 B2 | 2/2009 | Jeong et al. |
| 7,547,337 B2 | 6/2009 | Oh et al. |
| 7,547,338 B2 | 6/2009 | Kim et al. |
| 7,588,616 B2 | 9/2009 | Conrad et al. |
| 7,597,730 B2 | 10/2009 | Yoo et al. |
| 7,628,831 B2 | 12/2009 | Gomiciaga-Pereda et al. |
| 7,645,309 B2 | 1/2010 | Jeong et al. |
| 7,740,676 B2 | 6/2010 | Burnham et al. |
| 7,770,256 B1 | 8/2010 | Fester |
| 7,776,120 B2 | 8/2010 | Conrad |
| 7,779,506 B2 | 8/2010 | Kang et al. |
| 7,803,207 B2 | 9/2010 | Conrad |
| 7,805,804 B2 | 10/2010 | Loebig |
| 7,811,349 B2 | 10/2010 | Nguyen |
| 7,867,308 B2 | 1/2011 | Conrad |
| 7,922,794 B2 | 4/2011 | Morphey |
| 7,931,716 B2 | 4/2011 | Oakham |
| 7,938,871 B2 | 5/2011 | Lloyd |
| 7,979,959 B2 | 7/2011 | Courtney |
| 8,021,453 B2 | 9/2011 | Howes |
| 8,062,398 B2 | 11/2011 | Luo et al. |
| 8,100,999 B2 | 1/2012 | Ashbee et al. |
| 8,117,712 B2 | 2/2012 | Dyson et al. |
| 8,152,877 B2 | 4/2012 | Greene |
| 8,156,609 B2 | 4/2012 | Milne et al. |
| 8,161,599 B2 | 4/2012 | Griffith et al. |
| 8,225,456 B2 | 7/2012 | Hkan et al. |
| 8,484,799 B2 | 7/2013 | Conrad |
| 2002/0011050 A1 | 1/2002 | Hansen et al. |
| 2002/0062531 A1 | 5/2002 | Oh |
| 2002/0011053 A1 | 6/2002 | Oh |
| 2002/0112315 A1 | 8/2002 | Conrad |
| 2002/0134059 A1 | 9/2002 | Oh |
| 2002/0088208 A1 | 11/2002 | Lukac et al. |
| 2002/0178535 A1 | 12/2002 | Oh et al. |
| 2002/0178698 A1 | 12/2002 | Oh et al. |
| 2002/0178699 A1 | 12/2002 | Oh |
| 2003/0159238 A1 | 8/2003 | Oh |
| 2003/0159411 A1 | 8/2003 | Hansen et al. |
| 2003/0046910 A1 | 9/2003 | Lee et al. |
| 2003/0200736 A1 | 10/2003 | Ni |
| 2003/0066273 A1 | 11/2003 | Choi et al. |
| 2003/0106180 A1 | 11/2003 | Tsen |
| 2004/0010885 A1 | 1/2004 | Hitzelberger et al. |
| 2004/0025285 A1 | 2/2004 | McCormick et al. |
| 2004/0216264 A1 | 11/2004 | Shaver et al. |
| 2005/0081321 A1 | 4/2005 | Milligan et al. |
| 2005/0115409 A1 | 6/2005 | Conrad |
| 2005/0132528 A1 | 6/2005 | Yau |
| 2005/0138763 A1 | 6/2005 | Tanner et al. |
| 2005/0198769 A1 | 9/2005 | Lee et al. |
| 2005/0198770 A1 | 9/2005 | Jung et al. |
| 2005/0252179 A1 | 11/2005 | Oh et al. |
| 2006/0037172 A1 | 2/2006 | Choi |
| 2006/0042206 A1 | 3/2006 | Arnold et al. |
| 2006/0090290 A1 | 5/2006 | Lau |
| 2006/0123590 A1 | 6/2006 | Fester et al. |
| 2006/0137304 A1 | 6/2006 | Jeong et al. |
| 2006/0137306 A1 | 6/2006 | Jeong et al. |
| 2006/0137309 A1 | 6/2006 | Jeong et al. |
| 2006/0137314 A1 | 6/2006 | Conrad et al. |
| 2006/0156508 A1 | 7/2006 | Khalil |
| 2006/0162298 A1 | 7/2006 | Oh et al. |
| 2006/0162299 A1 | 7/2006 | North |
| 2006/0168922 A1 | 8/2006 | Oh |
| 2006/0168923 A1 | 8/2006 | Lee et al. |
| 2006/0207055 A1 | 9/2006 | Ivarsson et al. |
| 2006/0207231 A1 | 9/2006 | Arnold |
| 2006/0230715 A1 | 10/2006 | Oh et al. |
| 2006/0230723 A1 | 10/2006 | Kim et al. |
| 2006/0230724 A1 | 10/2006 | Han et al. |
| 2006/0236663 A1 | 10/2006 | Oh |
| 2006/0278081 A1 | 12/2006 | Han et al. |
| 2007/0067944 A1 | 3/2007 | Kitamura et al. |
| 2007/0077810 A1 | 4/2007 | Gogel et al. |
| 2007/0079473 A1 | 4/2007 | Min et al. |
| 2007/0079585 A1 | 4/2007 | Oh et al. |
| 2007/0095028 A1 | 5/2007 | Kim et al. |
| 2007/0095029 A1 | 5/2007 | Min et al. |
| 2007/0209334 A1 | 9/2007 | Conrad |
| 2007/0209335 A1 | 9/2007 | Conrad |
| 2007/0209338 A1 | 9/2007 | Conrad |
| 2007/0271724 A1 | 11/2007 | Hakan et al. |
| 2007/0289089 A1 | 12/2007 | Yacobi |
| 2007/0289264 A1 | 12/2007 | Oh |
| 2007/0289266 A1 | 12/2007 | Oh |
| 2008/0040883 A1 | 2/2008 | Beskow et al. |
| 2008/0047091 A1 | 2/2008 | Nguyen |
| 2008/0134460 A1 | 6/2008 | Conrad |
| 2008/0134462 A1 | 6/2008 | Jansen et al. |
| 2008/0178416 A1 | 7/2008 | Conrad |
| 2008/0178420 A1 | 7/2008 | Conrad |
| 2008/0190080 A1 | 8/2008 | Oh et al. |
| 2008/0196194 A1 | 8/2008 | Conrad |
| 2008/0301903 A1 | 12/2008 | Cunningham et al. |
| 2009/0100633 A1 | 4/2009 | Bates et al. |
| 2009/0113659 A1 | 5/2009 | Jeon et al. |
| 2009/0144932 A1 | 6/2009 | Yoo |
| 2009/0165431 A1 | 7/2009 | Oh |
| 2009/0205160 A1 | 8/2009 | Conrad |
| 2009/0205161 A1 | 8/2009 | Conrad |
| 2009/0205298 A1 | 8/2009 | Hyun et al. |
| 2009/0209666 A1 | 8/2009 | Hellberg et al. |
| 2009/0265877 A1 | 10/2009 | Dyson et al. |
| 2009/0282639 A1 | 11/2009 | Dyson et al. |
| 2009/0300874 A1 | 12/2009 | Tran et al. |
| 2009/0300875 A1 | 12/2009 | Inge et al. |
| 2009/0307564 A1 | 12/2009 | Vedantham et al. |
| 2009/0307863 A1 | 12/2009 | Milne et al. |
| 2009/0307864 A1 | 12/2009 | Dyson |
| 2009/0308254 A1 | 12/2009 | Oakham |
| 2009/0313958 A1 | 12/2009 | Gomiciaga-Pereda et al. |
| 2009/0313959 A1 | 12/2009 | Gomiciaga-Pereda et al. |
| 2010/0154150 A1 | 6/2010 | McLeod |
| 2010/0175217 A1 | 7/2010 | Conrad |
| 2010/0212104 A1 | 8/2010 | Conrad |
| 2010/0224073 A1 | 9/2010 | Oh et al. |
| 2010/0229321 A1 | 9/2010 | Dyson et al. |
| 2010/0242210 A1 | 9/2010 | Conrad |
| 2010/0243158 A1 | 9/2010 | Conrad |
| 2010/0293745 A1 | 11/2010 | Coburn |
| 2010/0299865 A1 | 12/2010 | Conrad |
| 2010/0299866 A1 | 12/2010 | Conrad |
| 2011/0146024 A1 | 6/2011 | Conrad |
| 2011/0168332 A1 | 7/2011 | Bowe et al. |
| 2012/0060322 A1 | 3/2012 | Simonelli et al. |
| 2012/0216361 A1 | 8/2012 | Millington et al. |
| 2012/0222245 A1 | 9/2012 | Conrad |
| 2012/0222262 A1 | 9/2012 | Conrad |
| 2013/0091660 A1 | 4/2013 | Smith |
| 2013/0091661 A1 | 4/2013 | Smith |
| 2013/0091812 A1 | 4/2013 | Smith |
| 2013/0091813 A1 | 4/2013 | Smith |
| 2014/0237768 A1 | 8/2014 | Conrad |
| 2016/0367094 A1 | 12/2016 | Conrad |

FOREIGN PATENT DOCUMENTS

| | | |
|---|---|---|
| CA | 2659212 A1 | 9/2010 |
| CN | 1434688 A | 8/2003 |
| CN | 1493244 A | 5/2004 |
| CN | 1875855 A | 12/2006 |
| CN | 1887437 A | 1/2007 |
| CN | 1911151 A | 2/2007 |
| CN | 1981688 A | 6/2007 |

(56) References Cited

FOREIGN PATENT DOCUMENTS

| | | |
|---|---|---|
| CN | 101108081 A | 1/2008 |
| CN | 101612025 A | 12/2009 |
| CN | 101657133 A | 2/2010 |
| CN | 102188208 A | 9/2011 |
| CN | 202277306 U | 6/2012 |
| CN | 103040412 A | 4/2013 |
| CN | 103040413 A | 4/2013 |
| DE | 875134 C | 4/1953 |
| DE | 4232382 C1 | 3/1994 |
| DE | 10360002 A1 | 12/2004 |
| DE | 102005047074 A1 | 4/2007 |
| DE | 602004009782 T2 | 8/2008 |
| DE | 112007003039 T5 | 10/2009 |
| DE | 112007003052 T5 | 1/2010 |
| EP | 493950 B1 | 4/1998 |
| EP | 1200196 B1 | 6/2005 |
| EP | 1779761 A2 | 5/2007 |
| EP | 1676516 B1 | 1/2010 |
| EP | 1629758 A3 | 2/2010 |
| FR | 2812531 B1 | 11/2004 |
| GB | 700791 A | 12/1953 |
| GB | 1111074 A | 4/1968 |
| GB | 2163703 | 3/1986 |
| GB | 2163703 B | 1/1988 |
| GB | 2268875 A | 1/1994 |
| GB | 2282979 B | 10/1997 |
| GB | 2365324 B | 2/2002 |
| GB | 2441962 B | 3/2011 |
| GB | 2466290 | 10/2012 |
| JP | 61131720 A | 6/1986 |
| JP | 2000140533 A | 5/2000 |
| JP | 2000140533 A1 | 5/2000 |
| JP | 2010178773 A | 8/2010 |
| JP | 2010220632 A | 10/2010 |
| JP | 2011189132 A | 9/2011 |
| JP | 2011189133 A | 9/2011 |
| KR | 1020060118795 A | 11/2006 |
| KR | 1020060118800 A | 11/2006 |
| KR | 1020060118802 A | 11/2006 |
| KR | 1020060118803 A | 11/2006 |
| WO | 9627446 A1 | 9/1996 |
| WO | 9809121 A1 | 3/1998 |
| WO | 9843721 A1 | 10/1998 |
| WO | 00/78546 A1 | 12/2000 |
| WO | 2004069021 A1 | 8/2004 |
| WO | 2006026414 A3 | 8/2007 |
| WO | 2008009883 A1 | 1/2008 |
| WO | 2008009888 A1 | 1/2008 |
| WO | 2008009890 A1 | 1/2008 |
| WO | 2008009891 A1 | 1/2008 |
| WO | 2009026709 A1 | 3/2009 |
| WO | 2010102396 A1 | 9/2010 |
| WO | 2010142968 A1 | 12/2010 |
| WO | 2010142969 A1 | 12/2010 |
| WO | 2010142970 | 12/2010 |
| WO | 2010142971 A1 | 12/2010 |
| WO | 2011054106 A1 | 5/2011 |
| WO | 2012042240 A1 | 4/2012 |
| WO | 2012117231 A1 | 9/2012 |

OTHER PUBLICATIONS

English machine translation of CN1875855, as published on Dec. 13, 2006.
English machine translation of CN1911151, as published on Feb. 14, 2007.
English machine translation of CN1981688, as published on Jun. 20, 2007.
English machine translation of CN101108081, as published on Jan. 23, 2008.
English machine translation of CN101612025, as published on Dec. 30, 2009.
English machine translation of CN101657133, as published on Feb. 24, 2010.
English machine translation of CN102188208, as published on Sep. 21, 2010.
English machine translation of CN103040412, as published on Apr. 17, 2013.
English machine translation of CN103040413, as published on Apr. 17, 2013.
English machine translation of CN202277306, as published on Jun. 20, 2012.
English machine translation of DE10360002, as published on Dec. 16, 2004.
English machine translation of DE102005047074, as published on Apr. 5, 2007.
English machine translation of DE112007003039, as published on Oct. 29, 2009.
English machine translation of DE112007003052, as published on Jan. 14, 2010.
English machine translation of DE602004009782T2, as published on Aug. 28, 2008.
English machine translation of KR1020060118795, as published on Nov. 24, 2011.
English machine translation of KR1020060118800, as published on Nov. 24, 2006.
English machine translatio of KR1020060118802, as published on Nov. 24, 2006.
English machine translation of KR1020060118803, a published on Nov. 24, 2006.
English machine translation of JP2011189133, as published on Sep. 29, 2011.
English machine translation of JP2010220632, as published on Oct. 7, 2010.
English machine translation of JP2010178773, as published on Aug. 19, 2010.
English machine translation of JP2000140533, as published on May 23, 2000.
English machine translation of JP61131720, as published on Jun. 19, 1966.
English machine translation of DE4232382, as published on Mar. 24, 1994.
English machine translation of FR2812531, as published on Sep. 20, 2010.
English machine translation of JP2011-189132, as published on Sep. 29, 2011.
English machine translation of CN1887437A, as published on Jan. 3, 2007.
English machine translation of DE875134C, as published on Apr. 30, 1953.
Makita BCL180 User Manual.
Makita 4071 Handy VAC.
Handbook of Air Pollution Prevention and Contriol, pp. 397-404, 2002.

* cited by examiner

CYCLONIC SURFACE CLEANING APPARATUS

CROSS-REFERENCE

This application is a continuation application of U.S. patent application Ser. No. 13/784,590 filed on Mar. 4, 2013, now allowed, which is a divisional application of U.S. patent application Ser. No. 12/675,611 filed on Feb. 26, 2010, which issued as U.S. Pat. No. 8,677,558 and which is a 371 of application PCT/CA2008/001534, which claimed priority from Canadian patent application number 2,599,303, which was filed on Aug. 29, 2007, the disclosure of each of which is incorporated herein by reference.

FIELD

This application relates to surface cleaning apparatus, such as vacuum cleaners.

BACKGROUND

The use of a cyclone, or multiple cyclones connected in parallel or series, is known to be advantageous in the separation of particulate matter from a fluid stream. Currently, many vacuum cleaners, which are sold for residential applications, utilize at least one cyclone as part of the air filtration mechanism.

U.S. Pat. No. 4,826,515 (Dyson) discloses a cyclonic vacuum cleaner having two cyclonic stages, namely a first stage for separating larger particulate matter from an air stream and a second stage for separating finer particulate matter from the same air stream. Each cyclonic stage comprised a single cyclone wherein separated particulate matter was collected in the bottom of the cyclones. Vacuum cleaners, which use a cyclonic cleaning stage comprising a plurality of cyclones in parallel, are also known.

As the cyclonic stage or stages fill, a user should empty the cyclonic stage or stages. Accordingly, the cyclonic stage or stages, or the entire vacuum cleaner, may be transported to a position above a receptacle (e.g. a garbage bin or a drain) and opened so as to allow the dirt or fluid to pour into the receptacle.

In order to inhibit hair and other larger matter from traveling downstream from a cyclone, a shroud, screen or filter is typically placed in covering relationship to the cyclone air outlet. From time to time, the shroud, screen or filter may become clogged and require cleaning.

SUMMARY

In accordance with one aspect, a surface cleaning apparatus comprises:
(a) a dirty air inlet;
(b) a filtration apparatus comprising a cyclone downstream from the dirty air inlet, the cyclone having a cyclone air outlet;
(c) a cyclone dirt collection chamber;
(d) a pre-motor filter chamber comprising a pre-motor filter;
(e) a suction motor; and,
(f) a clean air outlet downstream from the suction motor, wherein the cyclone dirt collection chamber and the pre-motor filter chamber are concurrently openable.

In any embodiment, the cyclone chamber may be openable.

In any embodiment, the cyclone chamber, the dirt collection chamber and the pre-motor filter chamber may be concurrently openable.

In any embodiment, the dirt collection chamber may be positioned around at least a portion of the cyclone.

In any embodiment, the dirt collection chamber may have a dirt collection surface that is moveable, the cyclone may have a cyclone wall that is moveable and is connected to the moveable dirt collection surface, whereby both the cyclone wall and the dirt collection surface are moveable concurrently such that the cyclone chamber, the dirt collection chamber and the pre-motor filter chamber are concurrently emptyable.

In any embodiment, the dirt collection surface and the cyclone wall may comprise a pivoting wall.

In any embodiment, the cyclone wall may include a vortex finder mounted thereto.

In any embodiment, the pivoting wall may be a lower surface of the cyclone chamber and the dirt collection chamber.

In any embodiment, the cyclone may be inverted.

In any embodiment, the pre-motor filter chamber may be positioned laterally from the cyclone.

In any embodiment, the pre-motor filter may comprise a headspace positioned below the pre-motor filter.

In any embodiment, the suction motor may be positioned adjacent the cyclone and the pre-motor filter.

In any embodiment, the surface cleaning apparatus may comprise a hand held vacuum cleaner.

In any embodiment, a headspace may be provided between the pre-motor filter and an openable door.

In any embodiment, the suction motor may be positioned axially aligned with the pre-motor filter.

In any embodiment, the pre-motor filter chamber may be positioned laterally from the cyclone.

In accordance with another aspect, a surface cleaning apparatus comprises:
(a) a dirty air inlet;
(b) a filtration apparatus comprising a cyclone downstream from the dirty
(c) air inlet, the cyclone having a cyclone air outlet;
(d) a cyclone dirt collection chamber;
(e) a pre-motor filter chamber comprising a pre-motor filter;
(f) a suction motor; and,
(g) a clean air outlet downstream from the suction motor; wherein the cyclone and the pre-motor filter chamber are concurrently openable.

In any embodiment, the pre-motor filter chamber may be positioned laterally from the cyclone.

In any embodiment, the suction motor may be positioned adjacent the cyclone and the pre-motor filter.

In any embodiment, the surface cleaning apparatus may comprise a hand held vacuum cleaner.

In accordance with another aspect, a surface cleaning apparatus comprises a filtration apparatus having a cyclone. The cyclone has an air inlet and an air outlet. A screen, such as a mesh wire screen, is positioned exterior to the cyclone in a filtration chamber, e.g., adjacent the cyclone air outlet. Accordingly, after the air exits the cyclone, the air passes through the screen. The screen may be accessed for cleaning by an access door, which is provided exterior to the cyclone (e.g. a door on an outer casing of the filtration apparatus).

In accordance with the prior art, a shroud or a screen may be provided interior of a cyclone (i.e., in the cyclone chamber). During use of the surface cleaning apparatus, elongate member such as hair and fibres may become adhered to the outer surface of the shroud or screen. Accordingly, in order to maintain the optimal cleaning efficiency of the vacuum cleaner, the shroud or screen must be cleaned from time to time. Either access must be provided to the interior of the cyclone to clean the shroud or screen, or, alternately, the shroud or screen must be removable. In accordance with this embodiment, a screen or other filtration member is positioned exterior to the cyclone. Accordingly, it is not necessary to remove a screen or shroud positioned within a cyclone chamber or to access the interior of the cyclone chamber in order to clean the screen.

In a particularly preferred embodiment, a cyclone chamber has no interior screen, shroud or filter covering the cyclone air outlet. Accordingly, no member requiring cleaning is positioned inside the cyclone chamber or surrounding the cyclone outlet (e.g. surrounding the vortex finder) and accordingly the cyclone outlet, e.g., the inlet to a vortex finder, is unobstructed.

The screen may have a surface area that is 2 times, preferably at least about 5 times, more preferably at least about 10 times and, most preferably at least about 20 times, e.g. 20-50 times, the cross sectional area of the cyclone air outlet. It will be appreciated that the screen may be flat or may be curved, e.g., bowl shaped. The use of such a large screen enhances the time during which the vacuum surface cleaning apparatus may be used without having to clean or replace the screen. Further, by positioning the screen exterior to the cyclone chamber, a large screen may be provided without reducing the size of the cyclone chamber.

In accordance with another aspect, there is provided a surface cleaning apparatus comprising:
  (a) a dirty air inlet;
  (b) a filtration apparatus comprising a cyclone downstream from the dirty air inlet, the cyclone having a cyclone air outlet;
  (c) a cyclone dirt collection chamber;
  (d) a suction motor;
  (e) a clean air outlet downstream from the suction motor; and,
  (f) an openable filtration chamber comprising a screen, the filtration chamber is mounted to the surface cleaning apparatus and positioned downstream from the cyclone air outlet and upstream from the suction motor.

In any embodiment, the filtration chamber may be openable independently of the dirt collection chamber. Alternately, the cyclone and the dirt collection chamber are openable independently of the filtration chamber.

In any embodiment, the screen may be moveably mounted, preferably removably mounted, in the filtration chamber, such as by being moveably mounted or removably mounted to an access door provided for the filtration chamber.

In any embodiment, the cyclone air outlet may comprise a vortex finder, the vortex finder may have an inlet positioned inside the cyclone and the inlet may be unobstructed.

In any embodiment, the dirt collection chamber may be positioned around at least a portion of the cyclone, the cyclone may have a dirt collection area and the dirt collection chamber and the cyclone may be concurrently openable. For example, the dirt collection chamber may have a dirt collection surface that is moveable, the cyclone may have a cyclone wall that is moveable and is connected to the moveable dirt collection surface, whereby both the cyclone wall and the dirt collection surface may be moveable concurrently such that the dirt collection chamber and the cyclone are concurrently emptyable.

In such an embodiment, the dirt collection surface and the cyclone wall may comprise a pivoting wall of the filtration apparatus. Preferably, the cyclone wall includes a vortex finder mounted thereto. Preferably, the pivoting wall is a lower surface of the filtration apparatus. The filtration chamber may be mounted to the pivoting wall.

In any embodiment, at least a portion of the filtration chamber may be transparent. For example, the filtration chamber may have an access door that is at least partially transparent, and preferably all of the access door is transparent.

In any embodiment, the cyclone may be inverted. However, it will be appreciated that the positioning of the screen may be used with a cyclone of any configuration or orientation. Further, the positioning may be used if a cyclonic stage comprises a single cyclone or a plurality of cyclones, or even if a plurality of cyclonic stages are used in series. If a plurality of cyclonic stages are provided, then it is preferred that the screen is positioned downstream of the first cyclonic stage and upstream of the next cyclonic stage.

It will be appreciated that the filtration chamber may be removably mounted to the filtration apparatus. Accordingly, the filtration chamber may be removed and then emptied. For example, once the filtration chamber is removed from the filtration apparatus, the filtration chamber may then be opened, e.g., by pivoting, sliding or translating a wall, e.g., the lower surface, of the filtration chamber. Alternately, the filtration chamber may be opened as it is removed. For example, the top of the filtration chamber may be removably mounted to the filtration apparatus by means of a screw mount or a bayonet mount with the mating surface of the filtration apparatus comprising a wall, e.g., a top, of the filtration chamber. Thus, when the filtration chamber is removed, it is open for emptying.

Preferably, the filtration chamber is mounted to the cyclone. For example, it may be mounted to the cyclone casing that houses the cyclone or any of the cyclonic stages.

It will be appreciated that the cyclone may be emptied when mounted to the surface cleaning apparatus. Accordingly, the filtration chamber may be openable while mounted to the surface cleaning apparatus so that it may be emptied when still affixed to the surface cleaning apparatus. Alternately, if the filtration chamber is removably mounted to the filtration apparatus, it may be removed from the surface cleaning apparatus for emptying.

It will also be appreciated that the cyclone (e.g., the filtration apparatus) may be removed from the surface cleaning apparatus for emptying. In such a case, the filtration chamber is preferably removable with the filtration apparatus, i.e. mounted or removably mounted to the filtration apparatus. It will also be appreciated that the filtration chamber may remain on the surface cleaning apparatus when the cyclone is removed for emptying.

It will also be appreciated that in any embodiment, additional screens and/or filtration members may be used.

In accordance with another aspect, there is also provided a preferred embodiment comprising:
  (a) a dirty air inlet;
  (b) a filtration apparatus having a lower surface and comprising a cyclone downstream from the dirty air inlet, the cyclone having a dirt outlet and a cyclone floor;
  (c) a dirt collection chamber in communication with the dirt outlet and having a dirt collection chamber floor;
  (d) an access door is provided on the lower surface, a filtration chamber is positioned between the lower surface and the access door and a screen is provided in the filtration chamber adjacent the lower air outlet of the cyclone;

(e) a suction motor; and, (f) a clean air outlet downstream from the suction motor.

In one such embodiment, the dirt collection chamber is positioned around at least a portion of the cyclone, the dirt collection chamber floor is moveable, the cyclone floor is moveable and is connected to the lower moveable dirt collection chamber floor and the lower surface comprises the cyclone floor and the dirt collection chamber floor, whereby both the cyclone floor and the dirt collection chamber floor are moveable concurrently such that the dirt collection chamber and the cyclone are concurrently emptied.

In another such embodiment the dirt collection chamber floor and the cyclone floor comprise a pivoting bottom of the filtration apparatus.

In another such embodiment the cyclone floor includes a vortex finder mounted thereto. The screen may be positioned beneath the vortex finder.

It will be appreciated by those skilled in the art that any of the embodiments may be used individually or in a single surface cleaning apparatus, as exemplified in a preferred embodiment described herein, or in any particular sub-combination. Accordingly, any two or more embodiments may be used in a single surface cleaning apparatus. In addition, any of the optional features described herein may be used in combination with any alternate embodiment or sub-combination or combination of alternate embodiments.

BRIEF DESCRIPTION OF THE DRAWINGS

These and other advantages will be more fully and completely understood in conjunction with the following description of the preferred embodiments in which.

DETAILED DESCRIPTION

As shown in FIGS. 1-6, a surface cleaning apparatus comprises a vacuum cleaner 10 having a filtration apparatus having at least one cyclone. The filtration apparatus may be of any design or configuration. As exemplified, surface cleaning apparatus 10 has a first housing 12 and a second housing 14. First housing 12 comprises at least one cyclone 16 and a dirt collection chamber 18 and second housing 14 houses the filtration members and the suction motor. In an alternate embodiment, it will be appreciated that surface cleaning apparatus 10 may have a first cyclonic cleaning stage comprising a single cyclone having a dirt collection chamber and a second cyclonic cleaning stage comprising a plurality of second stage cyclones in parallel. It will be appreciated that only a single filter may be provided and a side by side construction need not be used.

As exemplified in FIG. 3, suction motor 26 is positioned in second housing 14, preferably with a suction fan provided below the electric motor. Clean air outlet 60 is provided downstream from suction motor 26. An optional post-motor filter may be provided downstream from suction motor 26, such as in post-motor filter housing 62, which may be accessible via post motor filter housing door 64, which could be pivotally mounted to second housing 14.

As exemplified in FIGS. 1-6, vacuum cleaner 10 comprises a hand held vacuum cleaner. Accordingly, vacuum cleaner 10 may be provided with handle 54, which is affixed to lid 32 and lid 58 of second housing 14. Handle 54 may alternately be affixed to any other portion or portions of vacuum cleaner 10 as is known in the art. Optionally, as exemplified, on/off switch 56 may be provided on handle 54. On/off switch 56 may alternately be provided on any other portion of vacuum cleaner 10.

It will be appreciated that, surface cleaning apparatus may be a vacuum cleaner, a carpet extractor, a bare floor cleaner or the like. As exemplified, the surface cleaning apparatus is hand held. However the surface cleaning apparatus may be configured as an upright vacuum cleaner, a stick vacuum cleaner, a canister vacuum cleaner, a backpack or shoulder strap vacuum cleaner or other configuration known in the art. The surface cleaning apparatus may have a single cyclonic cleaning stage, which may be of any construction known in the art, or a plurality of cyclonic cleaning stages, each of which may be of any construction known in the art, e.g. they may comprise a single cyclone or a plurality of cyclones in parallel.

The following description is based on FIGS. 1-6, which exemplifies the use of an inverted cyclone. However, in an alternate embodiment, it will be appreciated that the cyclone 16 may be of any configuration and orientation and need not be inverted (e.g., cyclone 16 may be a horizontally mounted cyclone or a vertically mounted upright cyclone with an upper air inlet, an upper air out and a lower dirt outlet). Accordingly, the reference to "upper" and "lower" and "floor" are for convenience in the following discussion and relate to a preferred embodiment.

Figure 3:
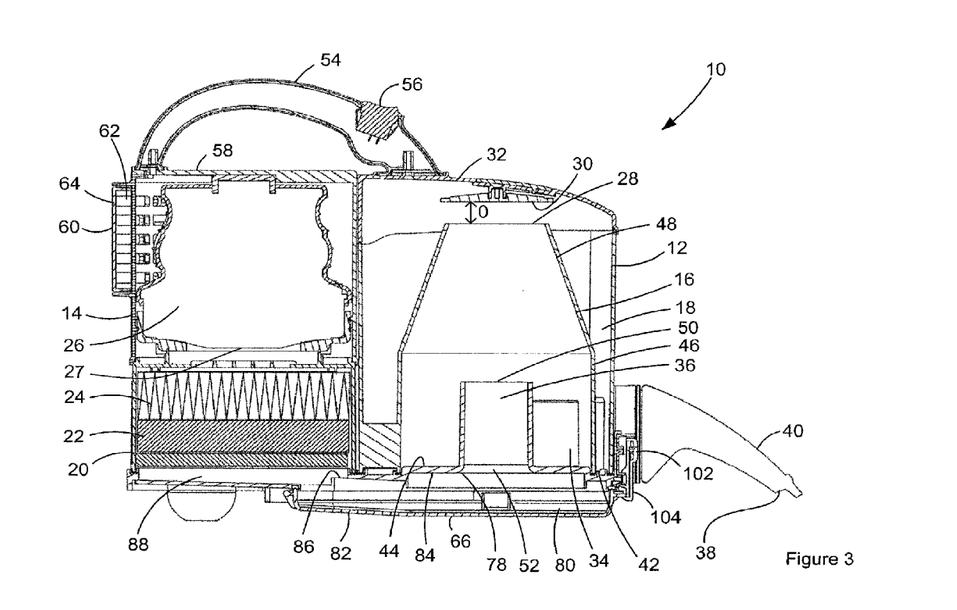
FIG. 3 is a cross-section along the line 3-3 in FIG. 2.
Figure 4:
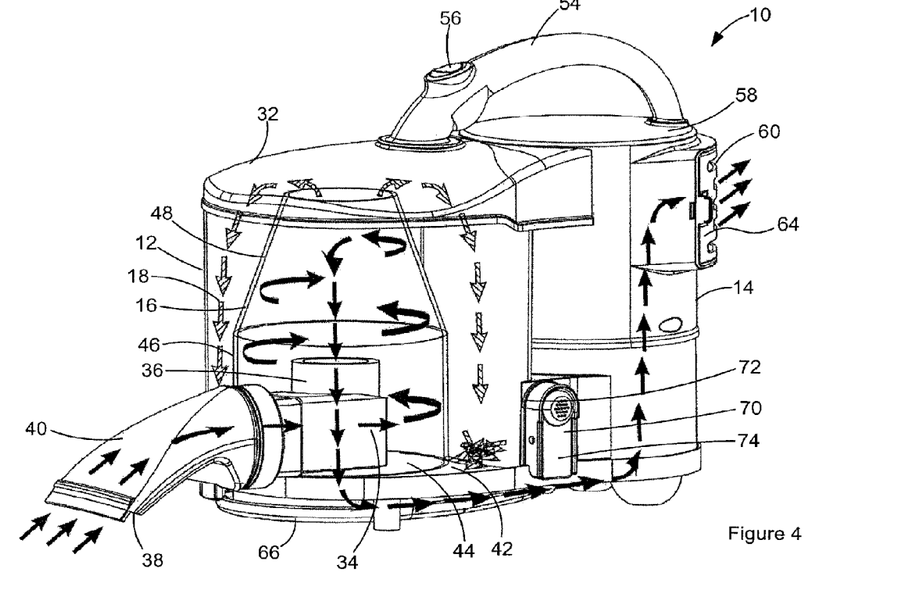
FIG. 4 is a schematic drawing of the vacuum cleaner of FIG. 1 showing the airflow passage therethrough.

As exemplified in FIG. 3, cyclone 16 has a lower air inlet 34 and a lower air outlet 36. Air inlet 34 is positioned downstream from dirty air inlet 38 of surface cleaning nozzle 40. Surface cleaning nozzle 40 may be any surface cleaning nozzle known in the art. Air inlet 34 of cyclone 16 may be in airflow communication with surface cleaning nozzle 40 in any manner known in the art. The exact structure of surface cleaning nozzle 40 and the communication passage between surface cleaning nozzle 40 and air inlet 34 will vary depending if the surface cleaning apparatus is an upright vacuum cleaner, canister vacuum cleaner or, as exemplified, a portable hand held vacuum cleaner. In operation, air will enter cyclone 16 through inlet 34 and travel upwardly, as exemplified in FIG. 4. The air will then travel downwardly to exit cyclone 16 via outlet 34. As shown in FIG. 4 by the hatched arrows, dirt will exit upwardly through outlet 28 and deposit on dirt collection chamber floor 42. In addition, some of the heavier particulate matter may not be entrained in the air stream and may be deposited on cyclone floor 34.

In an alternate embodiment, it will be appreciated that cyclone 16 may be any cyclone casing having a separator plate to divide the cyclone casing into an upper cyclone chamber positioned above the separator plate and a lower dirt collection chamber positioned below the separator plate.

Alternately, the cyclone may be provided with a dirt outlet 28 and may be provided with an impingement member 30 or members spaced a distance D from the dirt outlet and facing the dirt outlet. The cyclone may be an upright cyclone or a cyclone having a single direction of travel of the air.

As exemplified, cyclone 16 is a frustoconical cyclone having cylindrical portion 46 and frustoconical portion 48. Alternately, or in addition to the orientation of cyclone 16, it will be appreciated that cyclone 16 may be cylindrical, entirely frustoconical or any other shape known in the art.

As exemplified in FIG. 3, outlet 36 of cyclone 16 comprises a vortex finder that extends inwardly into the cyclone chamber defined by cyclone 16. Outlet 36 preferably comprises a generally cylindrical passage having an inlet 50 and an outlet 52. It will be appreciated that, in an alternate embodiment any outlet or vortex finder known in the art for cyclones may be utilized. While inlet 50 may be covered by a screen, shroud or filter as in known in the art, it is preferred that no screen, shroud or filter is provided. Accordingly, inlet 50 will not become clogged during use and will not require cleaning. Accordingly, it will be appreciated that bottom 44 need not be openable to permit a screen or a shroud or filter associated with inlet end 50 of outlet 36 to be cleaned. The material that would otherwise clog a screen or shroud that surrounds inlet 50 will be retained by screen 78 which may be easily accessed and with may be larger than a screen in a cyclone chamber.

While the use of impingement member 30 is exemplified in a surface cleaning apparatus having side-by-side housings 12, 14, it will be appreciated that this design may be used in any vacuum cleaner configuration. It will also be appreciated that an impingement surface need not be used.

In accordance with any embodiment, dirt collection chamber 18 may surround at least a portion of and, as exemplified, preferably all of cyclone 16. Accordingly, cyclone 16 may be positioned in dirt collection chamber 18 and, preferably, generally centrally therein.

In accordance with any embodiment, vacuum cleaner 10 may be configured such that the dirt collected on floor 44 of cyclone 16 is emptied at the same time as dirt collected on floor 42 of dirt collection chamber 18. The following description refers to the embodiment of FIGS. 1-6 wherein the openable end of the dirt collection camber is the dirt collection surface (floor 42). However, in an alternate embodiment, it will be appreciated that the openable portion need not be the dirt collection surface. For example, if cyclone 16 is mounted horizontally, then the openable portion may be the end of dirt collection chamber 18 facing dirt outlet 28 to which impingement member 30 is attached. In such a case, the dirt collection surface will be a sidewall of dirt collection chamber 18.

As exemplified, floor 42 and floor 44 are both movable and connected to each other whereby both floor 42 and 44 are concurrently movable such that dirt collection chamber 18 and cyclone 16 are concurrently emptied. In an alternate embodiment, dirt collection chamber 18 may be provided in the bottom of cyclone 16.

Figure 1:
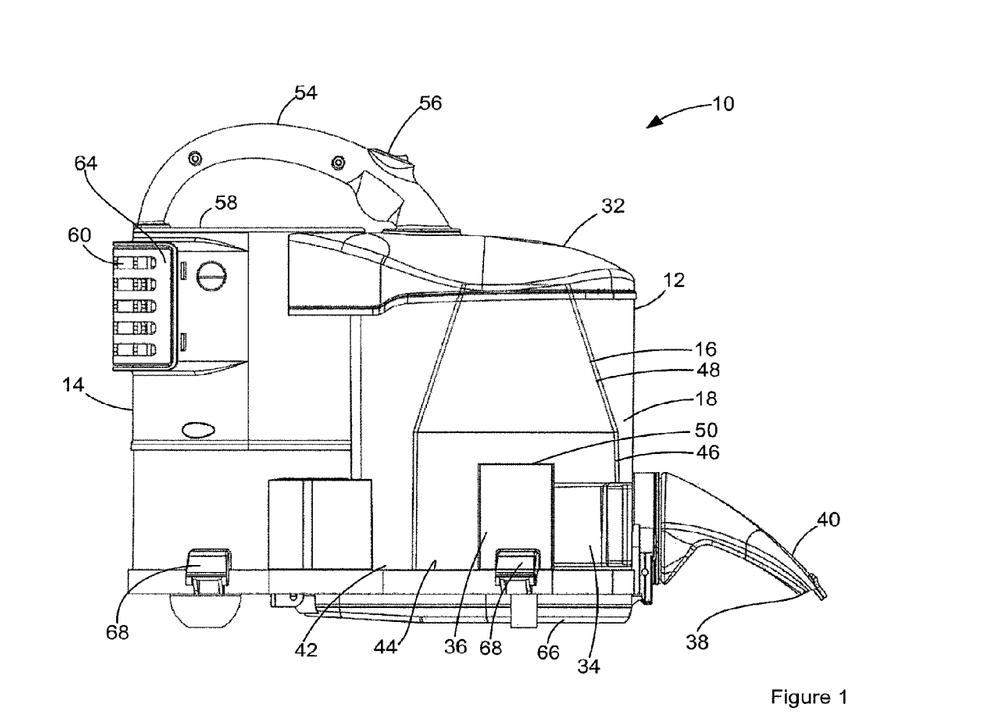
FIG. 1 is a side elevational view of a preferred embodiment of a vacuum cleaner in accordance with this design wherein the outer casing surrounding the cyclone and forming an outer wall of a dirt collection chamber is optionally transparent.
Figure 2:
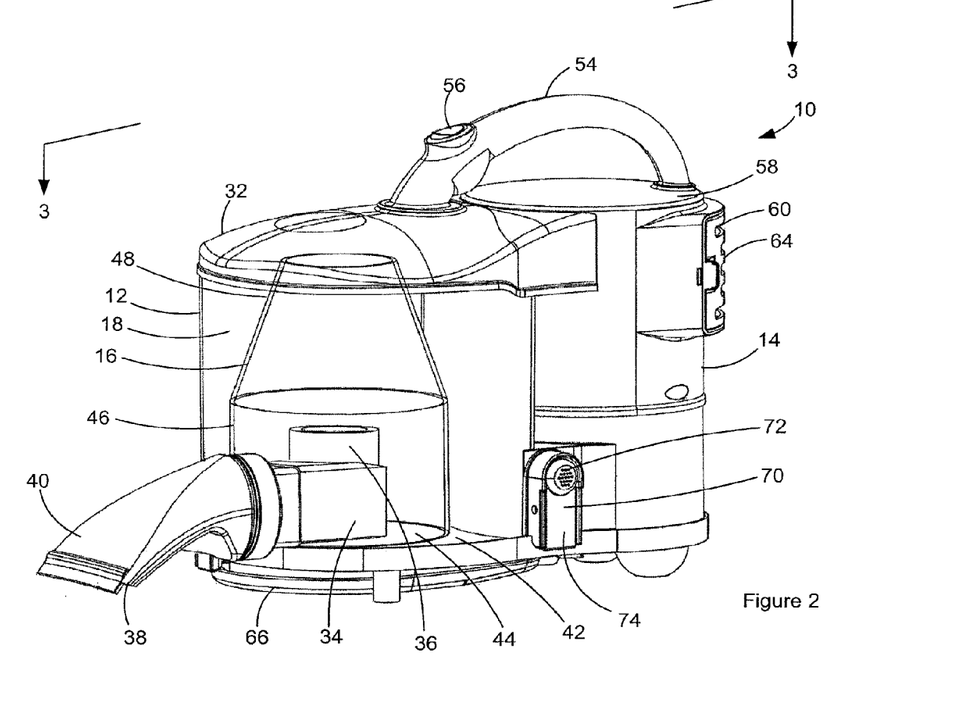
FIG. 2 is a perspective view from the front and the right side of the vacuum cleaner of FIG. 1.
Figure 5:
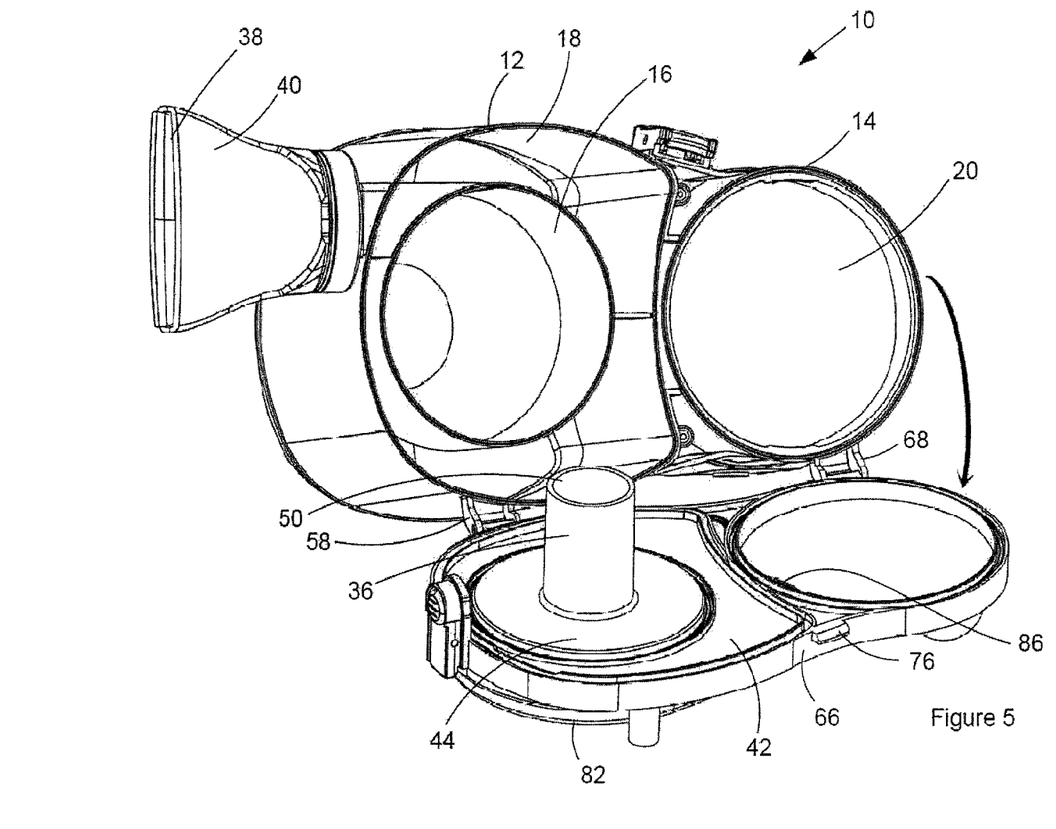
FIG. 5 is a perspective view from the bottom of the vacuum cleaner of FIG. 1 wherein the bottom of the first and second housings is open; and, FIG. 6 is a perspective view of the bottom of the vacuum cleaner of FIG. 1 wherein the first and second housings are closed but an access door is open.

Referring to FIG. 5, floors 42 and 44 may comprise a pivoting bottom of first housing 12 and, alternately, of the filtration apparatus (e.g. housings 12 and 14 of this embodiment). Accordingly, as seen in FIG. 5, when floors 42 and 44 are opened, both cyclone 16 and dirt collection chamber 18 may be emptied by holding vacuum cleaner 10 in the upright position (as shown in FIG. 1). Accordingly, the dirt will fall out of collection chamber 16 and cyclone 16 and will fall downwardly off of floors 42 and 44.

As shown in FIG. 5, housings 12 and 14 have a pivoting bottom 66, which is secured to each of housings 12 and 14 by a pivot 68. In the closed position exemplified in FIGS. 1 and 4, pivoting bottom 66 is secured in position by latch 70. Latch 70 has a button 72 which, when pressed, causes arm 74 to move outwardly thereby disengaging a flange provided on the bottom end of arm 74 from flange 76 provided on pivoting bottom 66. A gasket or other sealing member may be provided at the interface of housings 12 and 14 and pivoting bottom 66 to provide an air tight or fluid tight seal. It will be appreciated that bottom 66 may be moveable in any other direction by any other means known in the art (e.g., slideable, translatable) and may optionally be removable from housings 12, 14 (e.g., by a snap fit, a screw mount, a bayonet mount or the like). Further, bottom 66 may be moveably secured in position by any other means known in the art and need not be connected to surface cleaning apparatus 10 for relative motion thereto.

As exemplified in FIG. 5, outlet 36 is provided as part of floor 42, and is preferably integrally molded therewith. In an alternate embodiment, it will be appreciated that outlet 36 need not be removable from cyclone 16 with floor 42.

In an alternate embodiment, it will be appreciated that only floors 42 and 44 may be pivotably mounted to housing 12. In such an embodiment, foam filter 20 may remain sealed when cyclone 16 and dirt collection chamber 18 are emptied. In an alternate embodiment, a side-by-side of housings 12, 14 design as exemplified in FIG. 1 need not be utilized. In such a case, floor 42 and floor 44 may comprise the entire floor of the filtration assembly.

If bottom 66 opens both housings 12 and 14, then it will be appreciated that dirt positioned on the upstream surface of filter 20 will be emptied when bottom 66 is opened.

As exemplified, screen 78 is provided in an openable filtration chamber 80. As exemplified, filtration chamber 80 is provided as part of the lower surface of cyclone 16. It will be appreciated that it is preferred that filtration chamber 80 is positioned adjacent air outlet 36 of cyclone 16, or downstream of the first cyclonic stage if a plurality of cyclonic stages are provided. If filtration chamber is positioned beside cyclone 16, e.g., it is located where foam filter 20 is provided, it will be appreciated that filtration chamber 80 and cyclone 16 may be concurrently opened, e.g., by a pivoting bottom 66. Alternately, or in addition, using a similar construction, filtration chamber 80 may be opened when dirt collection chamber 18 is opened.

As exemplified, filtration chamber 80 is openable independently of any other member, e.g., cyclone 16, dirt collection chamber 18 and the chamber housing foam filter 20. Also, as exemplified, the lower surface of filtration chamber 80 is openable. However, it will be appreciated that an alternate wall or portion of filtration chamber 80 may be openable and that filtration chamber 80 may be at alternate locations on a surface cleaning apparatus provided it is located downstream in the fluid flow path through the surface cleaning apparatus from the first cyclonic cleaning stage.

As exemplified, filtration chamber 80 is provided adjacent outlet 36 and, preferably, screen 78 is in sealing engagement with outlet 52. It will be appreciated that screen 78 is preferably mounted in filtration chamber 80 such that the air exiting cyclone 16 is forced to pass through screen 78 as the air travel downstream of filtration chamber 80 (e.g., to a second cyclonic cleaning stage or foam filter 80). Referring to FIG. 3, screen 78 is positioned on rear surface 84 of floor 44 and overlies outlet 52. Accordingly, air that exits outlet 36 travels through screen 78. The air then travels through filtration chamber 80 and travels laterally to outlet 86, which is in air flow communication with headspace 88 below filter 20.

Preferably, screen 78 comprises a screen, such as an open mesh screen, e.g., a wire mesh screen or, alternately, a plastic mesh screen. It may be flat or curved, e.g. bowl shaped, so as to increase the surface area of the screen.

In one embodiment, filtration chamber 80 has an openable portion. Accordingly, an access door 82 may be provided to permit access to screen 78 such that screen 78 may be cleaned. Access door 82 may be any door that is movably mounted in overlying relationship to filtration chamber 80. It will also be appreciated that if filtration chamber 80 is removably mounted to surface cleaning apparatus 10, it may be opened as it is removed from surface cleaning apparatus 10. For example, a wall of surface cleaning apparatus 10 to which filtration chamber 80 is attached may close the side of filtration chamber 80 that abuts surface cleaning apparatus 10. However, it is preferred that a lower surface of filtration chamber 80 is openable.

Figure 6:
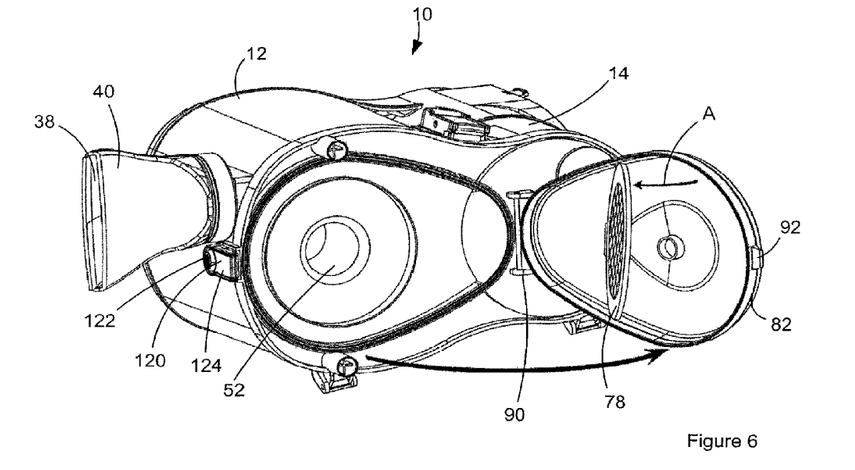

As exemplified in FIG. 6, access door 82 may be pivotally mounted by pivot 90 to pivoting bottom 66, and is secured in position by a latch 120. Latch 120, for example, may have a button 122 which, when pressed, causes arm 124 to move outwardly thereby disengaging a flange on the bottom end of arm 124 from flange 92 provided on the front end of access door 82. A sealing gasket or other sealing member known in the art may be utilized to provide an air tight or fluid tight seal for filtration chamber 80. Any other securing member known in the art may be used. Further door 82 may be removable and need not be connected to surface cleaning apparatus 10 for relative (e.g., sliding, translation) motion thereto.

Preferably, screen 78 is mounted and, more preferably, movably mounted and, most preferably, removably mounted to access door 82. As shown in FIG. 6, screen 78 is pivotally mounted to the inner surface of access door 82. Accordingly, when a user desires to clean screen 78, it may be pivoted in the direction shown by arrow A in FIG. 6 to an open or cleaning position. Alternately, screen 78 may be movably mounted and, preferably, removably mounted to another portion of filtration chamber 80.

It will be noticed that access door 82 may be opened independently of pivoting bottom 66. In an alternate embodiment, it will be appreciated that a pivoting bottom 66 need not be provided.

Preferably, at least a portion of and, more preferably, all of access door 82 is transparent. Accordingly, a user may lift the vacuum cleaner, invert the vacuum cleaner or tilt the vacuum cleaner on its side to view screen 78 and determine whether filtration 78 requires cleaning or, alternately, replacement. It will be appreciated that another part of filtration chamber 80, preferably all of filtration chamber 80, may be transparent.

As exemplified in FIG. 3, vortex finder 36 is not surrounded by a screen or any shroud or filter. In accordance with a preferred embodiment, vortex finder 36 has no cover member (e.g. shroud, screen or the like). Accordingly, no filtration or screen member interior of cyclone 16 requires cleaning. Accordingly, it will be appreciated that bottom 44 need not be openable to permit a screen or a shroud or filter associated with inlet end 50 of outlet 36 to be cleaned.

In accordance with any embodiment, a series of filtration members may be used in series downstream from screen 78. In accordance with this preferred embodiment, the filtration members may comprise two or more of a foam filter 20 downstream from screen 78, a felt filter 22 downstream from foam 20 and a HEPA filter 24 downstream from felt filter 22. Preferably, all of these filters are positioned upstream from suction motor 26. As shown, suction motor 26 has a suction motor inlet 27. Alternately, one or more of these filters may be positioned downstream from suction motor 26. In particular HEPA filter 24 may be downstream from suction motor 26. Accordingly, a plurality of screening and filtration members, each of which have a finer filtration capacity (e.g. smaller pores) are provided in series in the downstream direction. Optionally, a shroud (e.g. a perforated or apertured plastic cover) may be provided surrounding or overlying inlet 50 of outlet 36.

It will also be appreciated that any of the aforementioned embodiments may be used singly or in any particular combination or sub-combination of the remaining features listed above.

Although specific embodiments have been described, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art.

What is claimed is:

1. A surface cleaning apparatus comprising:
   (a) a dirty air inlet;
   (b) a filtration apparatus comprising a cyclone downstream from the dirty air inlet, the cyclone having an upper end, a lower end, a cyclone axis, a dirt outlet, a cyclone air inlet and a cyclone air outlet, wherein the cyclone air outlet comprises a passage that is positioned at the lower end of the cyclone;
   (c) a cyclone dirt collection chamber exterior to the cyclone and having a lower openable a dirt collection surface;
   (d) a suction motor having a suction motor axis, an upper end, a lower end, a suction motor inlet positioned at the lower end of the suction motor;
   (e) an air flow passage extending from the cyclone air outlet to the suction motor inlet and comprising a transversely extending portion; and,
   (f) a clean air outlet downstream from the suction motor.

2. The surface cleaning apparatus of claim 1 wherein air exiting the cyclone outlet travels transversely through the transversely extending portion of the air flow passage and upwardly to the suction motor inlet.

3. The surface cleaning apparatus of claim 1 wherein the cyclone and the dirt collection chamber are concurrently openable.

4. The surface cleaning apparatus of claim 1 wherein the dirt collection chamber is positioned around at least a portion of the cyclone.

5. The surface cleaning apparatus of claim 1 wherein the cyclone is inverted.

6. The surface cleaning apparatus of claim 1 wherein a pre-motor filter is positioned laterally from the cyclone and below the suction motor.

7. The surface cleaning apparatus of claim 1 wherein the suction motor axis and the cyclone axis are parallel and the suction motor is laterally spaced from the cyclone.

8. The surface cleaning apparatus of claim 1 wherein the surface cleaning apparatus comprises a hand held vacuum cleaner.

9. A surface cleaning apparatus having a first end and a second spaced apart end, the surface cleaning apparatus comprising:

(a) a dirty air inlet;
(b) a filtration apparatus comprising a cyclone downstream from the dirty air inlet, the cyclone having a cyclone axis, a dirt outlet, a cyclone air inlet and a cyclone air outlet, wherein the cyclone air outlet comprises a passage that is positioned towards the second end;
(c) a cyclone dirt collection chamber exterior to the cyclone and having an openable a dirt collection surface positioned towards the second end;
(d) a suction motor having a suction motor axis, an inlet end, an outlet end, a suction motor inlet positioned towards the second end;
(e) an air flow passage extending from the cyclone air outlet to the suction motor inlet and comprising a transversely extending portion; and,
(f) a clean air outlet downstream from the suction motor.

10. The surface cleaning apparatus of claim 9 wherein air exiting the cyclone outlet travels transversely through the transversely extending portion of the air flow passage and axially to the suction motor inlet.

11. The surface cleaning apparatus of claim 9 wherein the cyclone and the dirt collection chamber are concurrently openable.

12. The surface cleaning apparatus of claim 9 wherein a pre-motor filter is positioned laterally from the cyclone and upstream from the suction motor.

13. The surface cleaning apparatus of claim 9 wherein the suction motor axis and the cyclone axis are parallel and the suction motor is laterally spaced from the cyclone.

14. The surface cleaning apparatus of claim 9 wherein the surface cleaning apparatus comprises a hand held vacuum cleaner.

15. A surface cleaning apparatus having a front end and a rear end, the surface cleaning apparatus comprising:
(a) a dirty air inlet;
(b) a filtration apparatus comprising a cyclone downstream from the dirty air inlet, the cyclone having an upper end, a lower end, a cyclone axis, a dirt outlet, a cyclone air inlet and a cyclone air outlet, wherein the cyclone air outlet comprises a passage that is positioned at the lower end of the cyclone;
(c) a cyclone dirt collection chamber exterior to the cyclone and having a lower openable a dirt collection surface;
(d) a suction motor having a suction motor axis, the suction motor is positioned rearward of the cyclone;
(e) an air flow passage extending from the cyclone air outlet to the suction motor and comprising a transversely extending portion; and,
(f) a clean air outlet downstream from the suction motor wherein air exiting the cyclone outlet travels transversely through the transversely extending portion of the air flow passage and upwardly towards the suction motor.

16. The surface cleaning apparatus of claim 15 wherein the cyclone and the dirt collection chamber are concurrently openable.

17. The surface cleaning apparatus of claim 15 wherein the cyclone is inverted.

18. The surface cleaning apparatus of claim 15 wherein a pre-motor filter is positioned laterally from the cyclone and below the suction motor.

19. The surface cleaning apparatus of claim 15 wherein the suction motor axis and the cyclone axis are parallel and the suction motor is laterally spaced from the cyclone.

20. The surface cleaning apparatus of claim 15 wherein the surface cleaning apparatus comprises a hand held vacuum cleaner.

* * * * *